United States Patent
Gille et al.

[19]

[11] Patent Number: 6,158,503
[45] Date of Patent: Dec. 12, 2000

[54] AIR CONDITIONING CONDENSER HAVING A FLUID TANK WITH INTERCHANGEABLE CARTRIDGE

[75] Inventors: Gérard Gille, Paray Vielle Poste; Patrick Balthazard, Guignicourt, both of France

[73] Assignee: Valeo Thermique Moteur, La Verriere, France

[21] Appl. No.: 09/188,576

[22] Filed: Nov. 9, 1998

[30]   Foreign Application Priority Data

Nov. 10, 1997  [FR]   France ................................. 97 14099

[51] Int. Cl.[7] ................................. F28D 1/06; F28F 9/02; F25B 39/04
[52] U.S. Cl. ............................. 165/132; 165/174; 62/509
[58] Field of Search ..................... 165/132, 174, 165/175; 62/509

[56]              References Cited

U.S. PATENT DOCUMENTS

| | | | |
|---|---|---|---|
| 4,850,426 | 7/1989 | Fayolle et al. ........................... | 165/174 |
| 5,159,821 | 11/1992 | Nakamura ............................... | 165/132 |
| 5,666,791 | 9/1997 | Burk ........................................ | 62/509 |
| 5,709,106 | 1/1998 | Inaba et al. .............................. | 165/132 |
| 5,868,002 | 2/1999 | Matsubayashi ........................... | 62/509 |
| 5,884,503 | 3/1999 | Inaba ....................................... | 62/509 |
| 5,901,573 | 5/1999 | Kobayashi ............................... | 165/132 |
| 5,974,828 | 11/1999 | Guerand ................................... | 62/509 |
| 5,992,174 | 12/1999 | Mittelstrass .............................. | 62/509 |
| 6,000,465 | 12/1999 | Kawahara ................................ | 165/132 |

FOREIGN PATENT DOCUMENTS

| | | |
|---|---|---|
| 0 769 666 | 4/1997 | European Pat. Off. . |
| 34 16 304 | 11/1985 | Germany . |
| 09053868 | 2/1997 | Japan . |
| 683 556 | 3/1994 | Switzerland . |

OTHER PUBLICATIONS

Patent Abstracts of Japan vol. 097, No. 006, Jun. 30, 1997 & JP 09 053868 A ( Calsonic Corp; Nissan Motor Co. Ltd), Feb. 25, 1997.

French Search Report dated Jul. 24, 1998.

*Primary Examiner*—Ira S. Lazarus
*Assistant Examiner*—Tho Duong
*Attorney, Agent, or Firm*—Morgan & Finnegan LLP

[57]              ABSTRACT

In an air conditioning condenser having a fluid tank with interchangeable cartridge the tank is screwed axially into a connecting base which is in turn brazed to a header box of the condenser. It contains an interchangeable axial cartridge and is in communication with the header box through ducts provided in the connecting base. Applications include apparatus for air conditioning the passenger space of a motor vehicle.

16 Claims, 3 Drawing Sheets

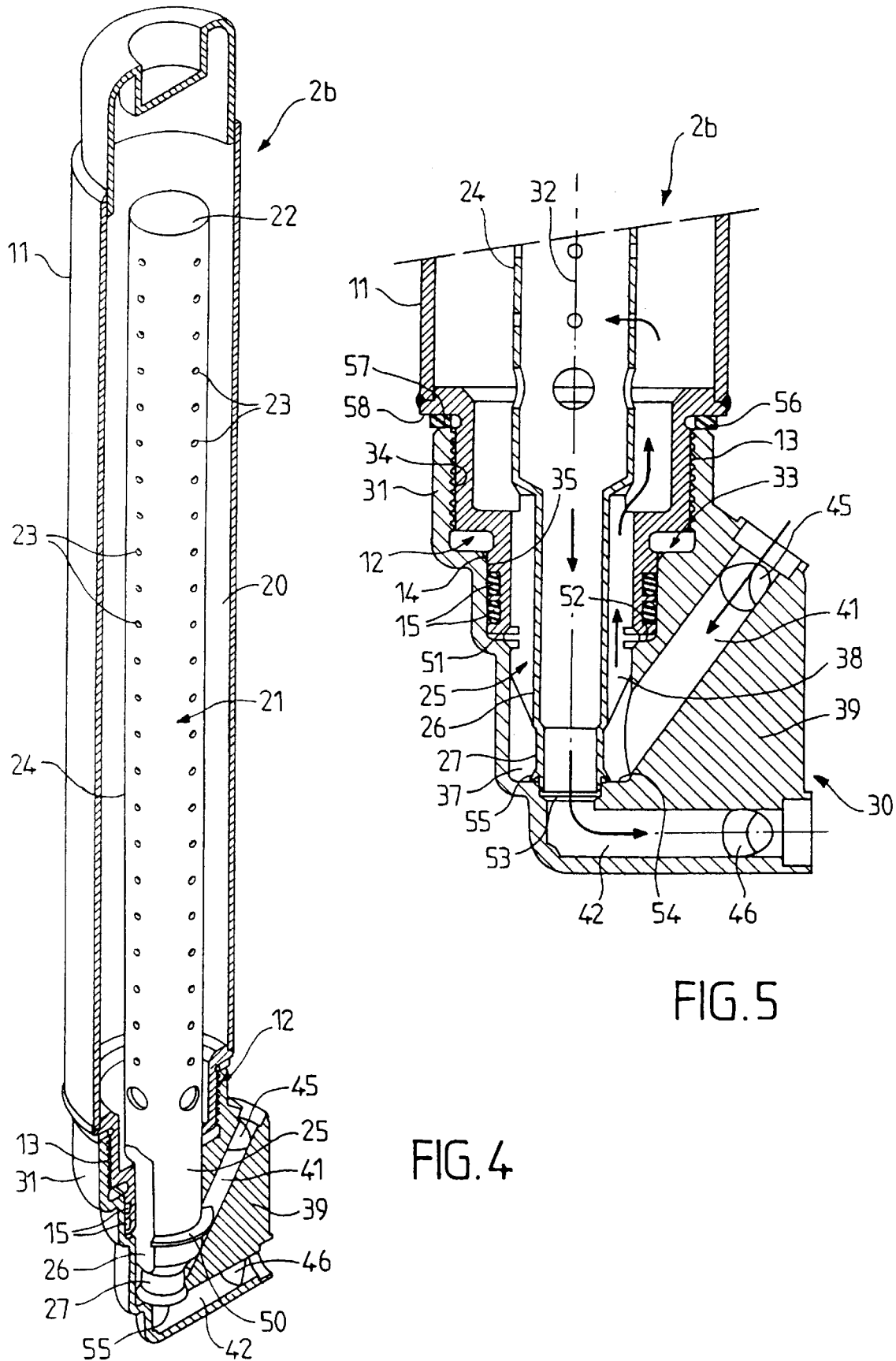

AIR CONDITIONING CONDENSER HAVING A FLUID TANK WITH INTERCHANGEABLE CARTRIDGE

BACKGROUND OF THE INVENTION

1. Field of the Invention

The invention concerns a condenser, in particular for a refrigerant fluid in a device for air conditioning the cabin of a motor vehicle, comprising a header box and an elongate intermediate tank for treating and/or accumulating a fluid removably fixed to a base attached to the header box through which two connecting ducts pass for transferring the fluid between the header box and the tank.

2. Description of the Prior Art

In a condenser of the above kind, and as is well known, the intermediate tank can fulfill some or all of the following functions: filtration and/or dehydration of the refrigerant fluid, compensation of variations in the volume of the refrigerant fluid, separation of the liquid and gas phases. Its intermediate position relative to the condenser allows only fluid in the liquid state to flow in the part of the condenser downstream of the tank and so the fluid is supercooled below the liquid/gas equilibrium temperature, improving the performance of the condenser and making its performance relatively independent of the quantity of fluid contained in the circuit.

EP-A-0 480 330 describes, in a vehicle air conditioning condenser, an intermediate tank removably fixed to a base attached to the header box, through which the two connecting ducts pass.

The tank has a head at the bottom end attached to its wall which is fixed to the base by means of a screw. The connecting ducts are partly in the base and partly in the head of the tank.

The above prior art embodiment is relatively complex and bulky. What is more, if the tank contains treatment agents, in particular for filtering and/or dehydrating the fluid, it must be replaced before those agents are used up. To this end it is necessary to unscrew the fixing screw, which can be very difficult, depending on its accessibility within the vehicle.

The aim of the invention is to remedy the above drawbacks.

SUMMARY OF THE INVENTION

The invention comprises a header box and an elongate intermediate tank for treating and/or accumulating a fluid removably fixed to a base attached to the header box, through which two connecting ducts for transferring the fluid between the header box and the tank pass, wherein the tank is provided at or near one end with means for fixing it to the base and contains an interchangeable treatment cartridge that can be withdrawn via said one end when the tank is separated from the base, said connecting ducts extending in the base as far as a position facing said one end.

Optional additional or alternative features of the invention are stated hereinafter:

The header box is elongate side by side with the tank and the tank is connected to the header box by a retaining flange in the vicinity of its other end.

The cartridge is elongate in the longitudinal direction of the tank and has a smaller cross-section than the inside section of the tank so as to define along the tank two path portions in series and in opposite directions for the fluid, one outside and the other inside the cartridge, between the two connecting ducts.

The cartridge includes a tubular jacket filled with active agents, advantageously closed at its end opposite said one end of the tank and the lateral wall of which includes openings for the fluid to pass through.

The cartridge is extended by an axial tube through which the fluid passes and which projects at said one end of the tank in order to be connected to the interior of the base at a first connecting duct.

The cartridge has over a portion of its perimeter a rib projecting radially outwards and trapped axially between the said one end of the tank and a shoulder on the base in order to immobilise the cartridge.

The first duct is substantially perpendicular to the longitudinal direction of the tank.

The second duct is oblique to the longitudinal direction of the tank and diverges from the first duct in the direction towards the header box.

The base has three substantially concurrent bores, two of which define the first and second ducts and the third of which defines a seat for the tank and spaces for transferring the fluid between the tank and said ducts.

The free end of the tube fits in the third bore from a shoulder constricting the bore and on respective opposite sides of which it communicates with the first and second ducts, respectively, and the tube has an inclined annular lip whose free edge bears on the same shoulder.

The first and second ducts a re respectively downstream and upstream of the tank.

The base is brazed to the external face of a tubular wall delimiting the header box.

The connecting ducts are substantially tangential to said tubular wall and discharge laterally through it.

The features and advantages of the invention will be explained in more detail in the following description with reference to the accompanying drawings.

BRIEF DESCRIPTION OF THE DRAWINGS

FIG. 4 is a perspective view in longitudinal section of the base and the tank of the condenser from FIGS. 1 and 2.

FIG. 5 is a sectional view on the midline of the base and the lower part of the tank.

DETAILED DESCRIPTION OF THE PREFERRED EMBODIMENT

Figure 3:
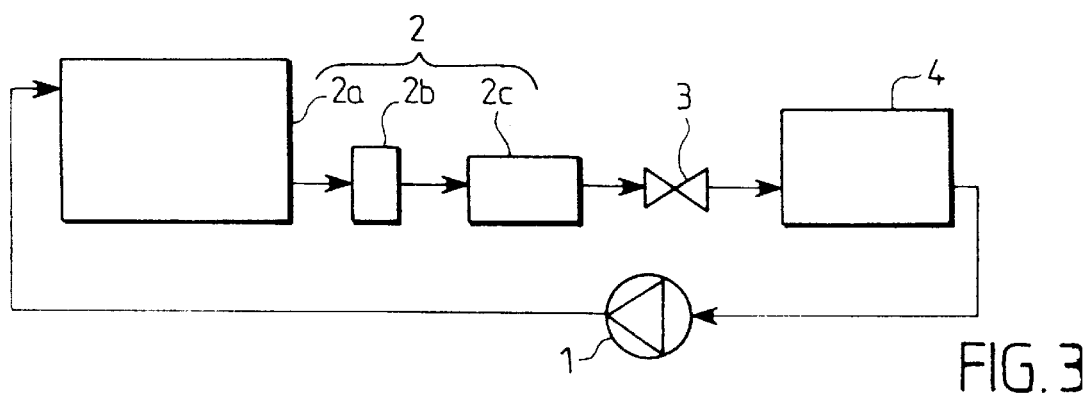
FIG. 3 is a schematic of a refrigerant fluid circuit incorporating the condenser.

FIG. 3 is a schematic of a refrigerant fluid circuit that is part of a device for air conditioning the cabin of a motor vehicle. In a manner that is known in itself the circuit includes in succession a compressor 1, a system 2 referred to hereinafter as the condenser, an expansion unit 3 and an evaporator 4. The condenser 2 has an upstream section 2a in which the refrigerant fluid gives up heat to a flow of air and is therefore condensed, after it has been "unsuperheated" from an inlet temperature higher than the liquid/gas equilibrium temperature, if necessary. The section 2a is followed by an intermediate tank 2b and then by a downstream section 2c in which the fluid is supercooled by exchanging heat with the flow of air.

Figure 1:
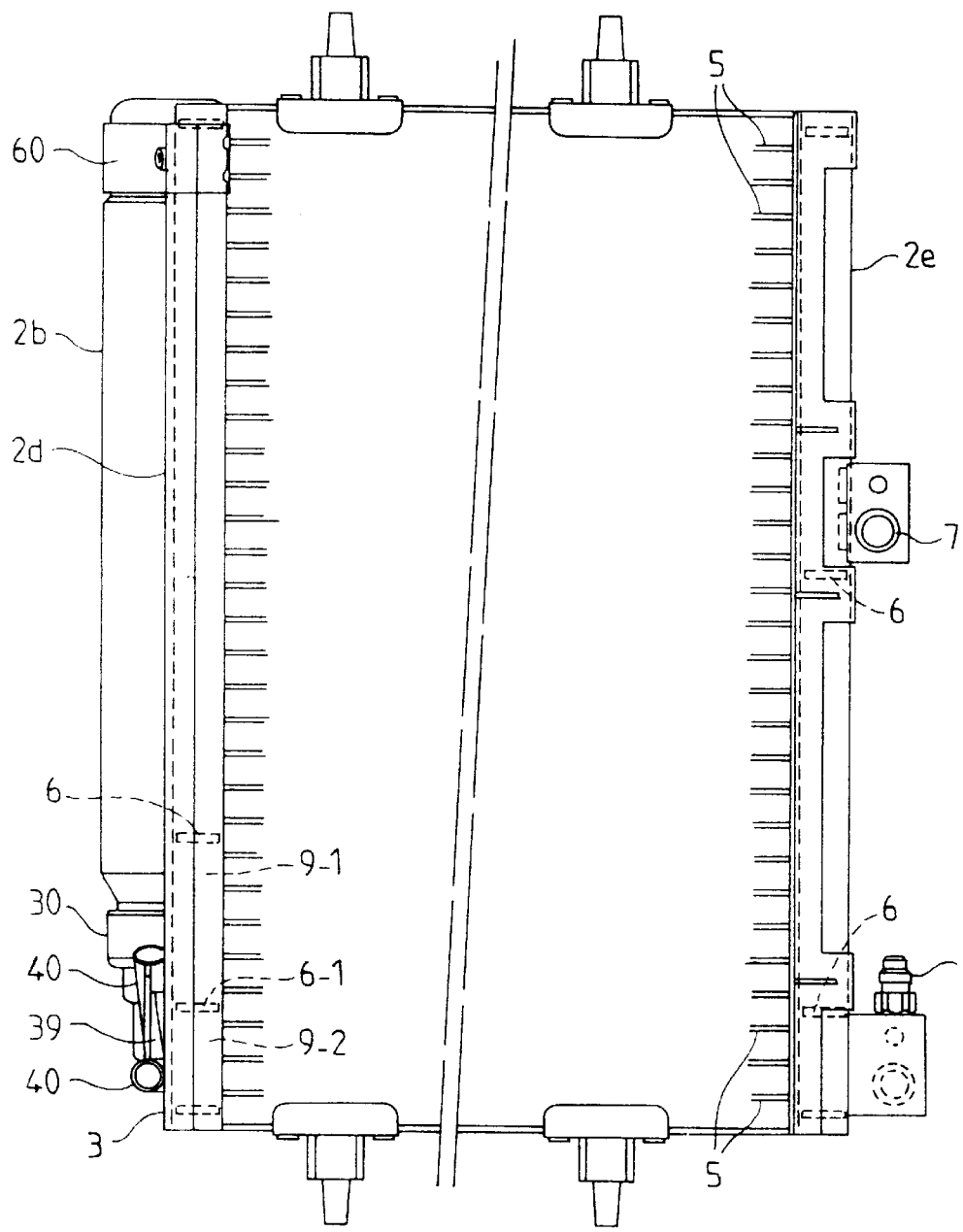
FIG. 1 is a front view of a condenser in accordance with the invention.
Figure 2:
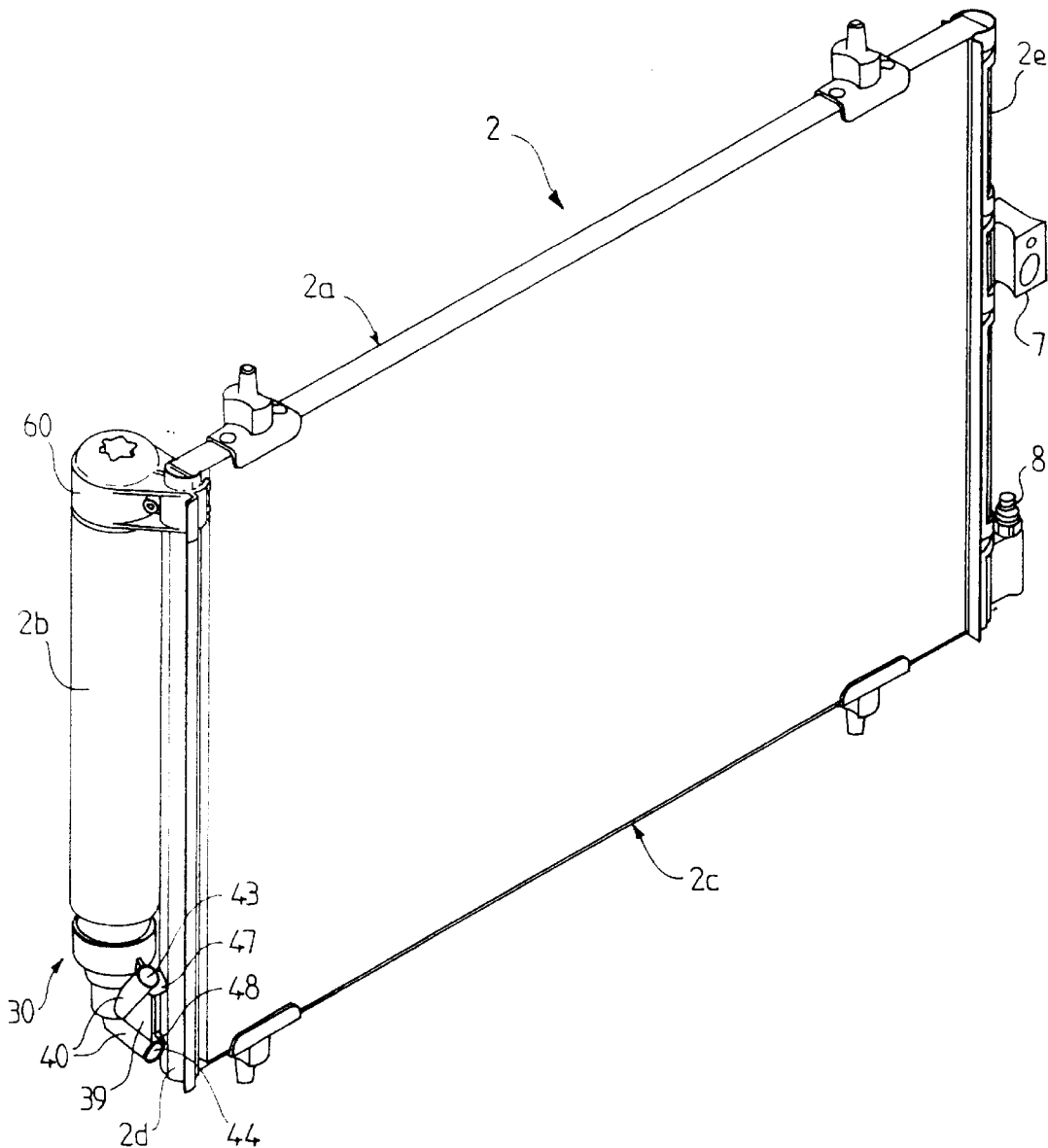
FIG. 2 is a perspective view of the condenser.

The general structure of one embodiment of the condenser 2 is shown in FIGS. 1 and 2. It comprises two vertically elongate header boxes 2d, 2e separated from each other in a horizontal direction and connected to each other by a multiplicity of horizontal fluid flow tubes 5. Each header box is divided into various chambers by horizontal partitions 6 so that the fluid in the tubes 5 flows alternately from a chamber of the box 2d to a chamber of the box 2e and vice versa, from the top chamber of the box 2e, which communicates with an inlet tube 7, to the bottom chamber of the same box 2e, which communicates with an outlet tube 8.

One intermediate partition 6-1 of the header box 2d separates chambers 9-1 and 9-2 respectively above and below the partition 6-1 and which communicate with each other exclusively via the vertically elongate tank 2b extending the box 2d.

As can be seen in FIGS. 4 and 5 in particular, the tank 2b comprises a casing formed of a cylindrical body 11 occupying the major part of its height and a constricted neck 12 at the bottom. The neck 12 has a region 13 provided with a male screwthread and a smaller diameter region 14 below this screwthreaded region in which there are two circumferential grooves to house two O-ring seals 15.

A filter and dehydrator cartridge 20 is disposed in the tank 2b, along its longitudinal axis. The cartridge has a tubular jacket 21 which can be closed at its top end 22 and which has orifices 23 through it over all of its height. The jacket is filled with particles for filtering and dehydrating the fluid. The jacket 21 is divided in the heightwise direction into three regions with different cross-sections.

A main region 24, extending from the top end of the jacket to the interior of the screwthreaded region 13 of the casing of the tank, and in which the orifices 23 are formed, has a circular cross-section with a diameter slightly less than the minimal inside diameter of the casing, i.e. the diameter of the region 14 thereof. The region 24 is followed in the downward direction by a region 25 whose cross-section is reduced by the provision of two diametrically opposed flats 26. Finally, a bottom region 27 again has a circular cross-section with a diameter slightly less than the distance between the flats 26. The bottom part of the region 25 and the region 27 project below the neck 12 of the tank to form an outlet tube of the tank, as explained below.

The tank 2b is mechanically connected to and in fluid communication with the header box 2d via a base 30 which is shown in detail in FIGS. 4 and 5. The base is preferably an aluminum alloy casting defining a substantially circular wall 31 around a vertical axis 32 which is also the axis of the tank and of the cartridge. The wall 31 delimits a bore 33 open at the top to receive the neck of the tank 2b. The lateral surface of the bore 33 has in an upper region a female screwthread 34 co-operating with the screwthread 13 of the tank. A cylindrical middle region 35 co-operates with the seals 15 and a cylindrical bottom region 36 surrounds the tube 25, 27 and with the region 27 delimits an annular space 37 which communicates with the interior of the tank via two vertical passages 38 facing the flats 26.

A flange 39 lying substantially in a plane through the axis 32 is joined to the wall 31. The flange has enlargements 40 on respective opposite sides of this plane which accommodate two elongate ducts 41, 42 parallel to this plane. In an intermediate step of manufacturing the base, as shown in FIG. 5, the respective ends of the duct 41 open into the bore 33 at the level of the annular space 37 and onto the free edge of the flange 39 and the duct is inclined upwards from one to the other. The duct 42 extends horizontally from the free edge of the flange to the end wall of the bore 33, to which it is joined. In the finished base brazed-on stoppers 43, 44 (see FIG. 2) close and seal the free ends of the ducts 41, 42 and the latter discharge externally of the base exclusively via passages 45, 46 in lateral bosses 47, 48 formed on the enlargements 40.

The tubular wall 21 of the cartridge has an external circumferential rib 50 formed of two diametrically opposed parts each extending along a circular arc between the two flats 26 of the region 25. When the tank is screwed to the base the rib 50 is trapped between the bottom end 51 of the neck and a shoulder 52 on the wall 31 facing it. The rib 50 has inclined top and bottom faces that co-operate with chamfers on the neck and on the wall 31. Positioning of the cartridge is completed by fitting the bottom end 53 of the bottom region 27 into the bore 34 immediately below a shoulder 54 in the bore which delimits the bottom of the annular space 37. Also, the region 27 has an inclined annular lip 55 whose free edge bears on the shoulder 54. A flat annular seal 56 is clamped between the free end 57 of the wall 31 and the radial shoulder 58 joining the neck 12 to the body 11 of the tank.

The base 30 is fixed to the header box 2d by brazing the ends of the bosses 47, 48 to the exterior face of the tubular sheet aluminum wall of the casing when assembling the condenser by brazing. The passages 45 and 46 communicate with the respective chambers 9-1 and 9-2 of the fluid box via holes in the tubular wall of the box. The condensed fluid reaching the chamber 9-1 passes from the chamber into the annular space 37 via the passage 45 and the inclined duct 41 and then enters the tank 2b screwed into the base via the vertical passages 38. The liquid phase then passes through the holes 23 into the cartridge where it flows downwards and is dried and filtered by the active particles contained in the cartridge. Any residual gas phase collects in the upper part of the tank. The fluid leaves the tank, exclusively in the liquid state, via the tube 25, 27 and reaches the chamber 9-2 of the header box 2d through the horizontal duct 42 and the passage 46. Accordingly, the tubes 5 and the chambers of the boxes 2d and 2e above the partition 6-1, including the chamber 9-1, constitute the upstream section 2a of the condenser and the tubes and the chambers below that partition, including the chamber 9-2, constitute the downstream section 2c.

A retaining flange 60 mechanically connects the top end of the tank 2b to that of the header box 2d for more stable fixing of the tank.

It is particularly simple to replace the cartridge because all that is required is to unscrew the tank, extract the spent cartridge, insert a new cartridge and screw the tank back on.

What is claimed:

1. A condenser for a refrigerant fluid in a device for air conditioning the cabin of a motor vehicle comprising:
   a header box;
   an intermediate tank for treating and/or accumulating a fluid, said tank removably fixed to a base at one end which is attached to said header box;
   two connecting ducts for transferring said fluid between said header box and said tank, said connecting ducts configured to pass through said base;
   wherein said tank is provided with means for fixing it to said base and contains an interchangeable treatment cartridge that can be withdrawn via said one end when said tank is separated from said base, and
   wherein said cartridge is elongated in a longitudinal direction of said tank and has a smaller cross-section than the inside section of said tank so as to define along said tank two path portions in series and in opposite directions for said fluid, one outside and the other inside said cartridge, between said two connecting ducts.

2. The condenser according to claim 1, wherein said header box is elongated side by side with said tank and said tank is connected to said header box by a retaining flange in the vicinity of its other end.

3. The condenser according to claim 1, wherein said cartridge comprises a tubular jacket filled with active agents, advantageously closed at its end opposite said one end of said tank and the lateral wall of which includes openings for said fluid to pass through.

4. The condenser according to claim 1, wherein said cartridge is extended by an axial tube through which said fluid passes and which projects at said one end of said tank for connection to the interior of said base at a first connecting duct.

5. The condenser according to claim 1, wherein said cartridge has over a portion of its perimeter a rib projecting radially outwards and trapped axially between said one end of said tank and a shoulder on said base in order to immobilize said cartridge.

6. The condenser according to claim 1, wherein said first duct is substantially perpendicular to the longitudinal direction of said tank.

7. The condenser according to claim 1, wherein said second duct is oblique to the longitudinal direction of said tank and diverges from said first duct in the direction towards said header box.

8. The condenser according to claim 7, wherein said base has three substantially concurrent bores, two of which define said first and second ducts and the third of which defines a seat for said tank and spaces for transferring said fluid between said tank and said ducts.

9. The condenser according to claim 8, wherein said cartridge is extended by an axial tube through which said fluid passes and which projects at said first end of said tank in order to be connected to the interior of said base at a first connecting duct, the free end of said tube fits in said third bore from a shoulder constricting said bore and on respective opposite sides of which it communicates with said first and second ducts, respectively, and said tube has an inclined annular lip whose free edge bears on the same shoulder.

10. The condenser according to claim 1, wherein said first and second ducts are respectively downstream and upstream of said tank.

11. The condenser according to claim 1, wherein said base is brazed to the external face of a tubular wall delimiting said header box.

12. The condenser according to claim 11, wherein said connecting ducts are substantially tangential to a tubular wall of the header box and discharge laterally through it.

13. The condenser claimed in claim 12, wherein said connection ducts are substantially tangential to said tubular wall and discharge laterally through it.

14. A condenser for an air-conditioning device comprising:

a header box;

a base connected to said header box;

an intermediate tank having an inner space for housing a removable treatment cartridge, and removably connected to said base; and wherein said base has at least two ducts therein to allow fluid flow between said header box and said intermediate tank; and wherein said base has two ducts and three openings, two of the opening define ends of the two ducts and are connected to said header box, and a third opening defines a seat for said tank, and wherein said cartridge has a tubular shape and has a first end and a second end, said first end is closed and said second end is operatively connected to said tank and said third opening in said base.

15. The condenser according to claim 3, wherein the connecting ducts are substantially tangential to a tubular wall of the header box and discharge laterally through it.

16. The condenser according to claim 14, wherein the base is an aluminum alloy casting.

* * * * *